United States Patent
Davolio et al.

(10) Patent No.: US 7,467,503 B2
(45) Date of Patent: Dec. 23, 2008

(54) AUTOMATED SYSTEM FOR THE DELIVERY, GROUPING AND DISTRIBUTION OF ARTICLES CONNECTED TO ONE ANOTHER BY A RESTRAINING LOOP

(75) Inventors: Maurizio Davolio, Vignola (IT); Franco Gambarelli, Spezzano di Fiorano (IT)

(73) Assignee: Swisslog Italia S.p.A., Milan (IT)

( * ) Notice: Subject to any disclaimer, the term of this patent is extended or adjusted under 35 U.S.C. 154(b) by 540 days.

(21) Appl. No.: 10/508,635

(22) PCT Filed: Mar. 12, 2003

(86) PCT No.: PCT/IB03/00926

§ 371 (c)(1),
(2), (4) Date: Sep. 17, 2004

(87) PCT Pub. No.: WO03/078283

PCT Pub. Date: Sep. 25, 2003

(65) Prior Publication Data

US 2005/0188652 A1      Sep. 1, 2005

(30) Foreign Application Priority Data

Mar. 19, 2002    (EP) ................................ 02425170

(51) Int. Cl.
*B65B 57/10*      (2006.01)
*B65B 61/14*      (2006.01)
*B65B 15/04*      (2006.01)
*B65B 15/00*      (2006.01)

(52) U.S. Cl. .................. 53/495; 53/128.1; 53/134.1; 53/136.1; 53/139.4; 53/147; 53/531; 53/542; 53/582; 53/589; 53/591; 100/26

(58) Field of Classification Search ............... 53/591, 53/495, 134.1, 136.1, 128.1, 139.4, 139.1, 53/542, 531, 147, 582, 589; 100/8, 12, 26; 206/554

See application file for complete search history.

(56) References Cited

U.S. PATENT DOCUMENTS 3,864,895 A * 2/1975 Petrea ..................... 53/136.1

(Continued)

FOREIGN PATENT DOCUMENTS

GB      2238033 A * 5/1991

(Continued)

OTHER PUBLICATIONS

International Search Report mailed Jul. 10, 2003 in PCT International Application No. PCT/IB03/00926 (6 pages).

*Primary Examiner*—Stephen F Gerrity
(74) *Attorney, Agent, or Firm*—Flynn, Thiel, Boutell & Tanis, P.C.

(57) ABSTRACT

An automatic system for the delivery and distribution of articles in groups comprises a store of articles, a unit for the collection and delivery of articles from the store and a controller associated with the collection and delivery unit in order to control the selective collection of articles from the store and their output as sets of articles logically grouped together. The system further comprises a grouping device which receives the sets of articles logically grouped together as inputs and outputs corresponding packs, groups or bundles of articles physically connected to one another by a restraining loop or strip.

13 Claims, 6 Drawing Sheets

U.S. PATENT DOCUMENTS

| | | | |
|---|---|---|---|
| 4,519,504 A | 5/1985 | Nausedas | |
| 5,036,647 A * | 8/1991 | Taylor et al. | 53/542 |
| 5,433,060 A * | 7/1995 | Gur et al. | 53/134.1 |
| 5,468,110 A | 11/1995 | McDonald et al. | |
| 5,720,154 A * | 2/1998 | Lasher et al. | 53/495 |
| 5,880,443 A | 3/1999 | McDonald et al. | |
| 5,963,453 A | 10/1999 | East | |
| 6,170,230 B1 | 1/2001 | Chudy et al. | |
| 6,212,855 B1 * | 4/2001 | Yasunaga et al. | 53/591 |
| 6,217,273 B1 | 4/2001 | Peroni et al. | |
| 6,289,656 B1 | 9/2001 | Wangu et al. | |
| 6,481,184 B1 * | 11/2002 | Junker et al. | 53/134.1 |
| 6,726,794 B2 * | 4/2004 | Belt | 53/136.1 |
| 7,003,926 B2 * | 2/2006 | Yamamoto et al. | 53/136.1 |
| 7,093,404 B2 * | 8/2006 | Kubo et al. | 53/136.1 |
| 7,293,591 B2 * | 11/2007 | Nakagawa et al. | 53/136.1 |

FOREIGN PATENT DOCUMENTS

WO     WO 98/58841     12/1998

\* cited by examiner

AUTOMATED SYSTEM FOR THE DELIVERY, GROUPING AND DISTRIBUTION OF ARTICLES CONNECTED TO ONE ANOTHER BY A RESTRAINING LOOP

FIELD OF THE INVENTION

The present invention relates to an automated system and to a method for the delivery and distribution of articles in groups, as well as to a device and to a method for grouping articles together.

BACKGROUND OF THE INVENTION

A particularly important, but non-limiting, field of application of the present invention is that of the management of stores of drugs and other pharmaceutical or medical products, with particular reference to the selective distribution of these products within hospital establishments in accordance with requirements for the administration of the products to individual patients. There is an ever greater need to provide automatic systems and stores in which medical products are stored in individual doses and from which these products can be withdrawn, grouped together in various ways, on the basis of instructions or orders which reflect the specific prescriptions for the use of medical products and for the administration of drugs to the various patients under treatment.

For simplicity and clarity of explanation, reference will be made below to the grouping-together of medical products but, naturally, the present invention may equally well be applied to other fields which have similar problems such as, for example, for fulfilling orders for spare parts for motor vehicles or other machines, for the grouping-together of components for the manufacture of industrial products such as, for example, electronic components, small metal parts, and the like.

Many known systems for the automated withdrawal of medical products from a store, in which the products are preferably stored in individual doses, provide for the selection of all of the product doses which make up the individual orders and for their delivery in groups at the output by depositing them in cases, boxes, trays, bags or other similar containers, each of which corresponds to a particular order which represents, for example, the prescription for the daily administration of drugs to a specific patient.

These known systems have several disadvantages, amongst which the most obvious is the need to provide a sufficient number of containers into which the automated withdrawal and delivery system can discharge the various products which make up the various orders. This method of operation leads to a complex organization, which can usually be managed only manually, if the containers, for example, the cases or boxes, have to be reused. In fact, once the prescribed drugs have been administered to the patients, the empty containers have to be collected from each patient and returned to the automated withdrawal and delivery system. If, on the other hand, disposable containers, for example, paper or plastics envelopes or bags, are used, the overall running cost of the automated system may become particularly high because of the large number of disposable containers which have to be provided and used purely to keep the products physically grouped together. In this connection, it will suffice to consider the large numbers of orders for the administration of medical products which an automated system of the type indicated above is required to fulfill daily, even in small hospital establishments.

The above-mentioned disadvantage is aggravated in situations in which the individual prescriptions for drugs or medical products involve a small number of products in individual doses. Clearly, the burden of the management of the empty containers, or the cost of the disposable containers, is less if the larger is the number of products included in each individual order and grouped together in each individual container. In general, however, and in particular for the daily administration of pharmaceutical and medical products to patients in hospital establishments, it is possible to increase the number of products to be grouped together for each individual order only at the expense of the efficacy and overall usefulness of the automated system for the withdrawal and delivery of products for the final purposes for which it is intended.

There is a risk that the disadvantages indicated above will greatly limit the spread of automated systems for the management or orders for medical prescriptions, which could otherwise contribute enormously to the reduction of the management costs of hospital establishments, increasing their overall efficiency, enabling the personnel employed in the manual selection and distribution of drugs and of medical products in general to be assigned to more skilled activities.

The object of the present invention is therefore to overcome the disadvantages described above by providing a device and a method for the grouping-together of articles, which device and method are simple, economical and efficient, particularly but not exclusively when used for grouping together drugs and medical products to be distributed within automated systems used in hospital establishments.

SUMMARY OF THE INVENTION

In order to achieve the object indicated above, the subject of the invention is an automated system and a method for the delivery and distribution of articles in groups, as well as a device and a method for grouping articles together, having the characteristics indicated in the appended claims.

According to an advantageous characteristic of the invention, the groups or bundles of articles grouped together are identified individually by respective labels connected to the bundles and preferably generated at the moment when the products are grouped together.

The device of the present invention provides for the various articles to be grouped together in a bundle held together by a restraining means, preferably of elongate shape, such as, for example, a thread or a strip, connected to each product of an individual group, for example, by means of a glue, clips, or other similar means. In a preferred embodiment, the thread or strip is inserted through holes provided in the articles before being closed into a loop. In particular, the restraining means may be a thread or strip of plastics material or other material which can be welded to form the closed loop, or may be a notched band or other member provided with similar closure means.

In a preferred embodiment, the automatic device comprises a load-bearing structure for supporting the various members of the machine, including guide means for providing the restraining means with an obligatory path to be followed during its application, comprising at least one fixed guide member and one guide member which is movable relative to the load-bearing structure, and feed means for supplying the restraining means, the feed means being operable in a direct-feed mode in order to urge the restraining means through the guide means, and in a reverse-feed mode in order to return the restraining means, and means for retaining the restraining means. The guide means form a path for the restraining means through the packages of products.

A particular advantage of this device is that the grouping-together of the articles can be achieved by the insertion of the restraining means through holes which already exist in the packages or which may possibly be created automatically when the articles are grouped together. There is thus no need to squeeze the products into close contact with one another, possibly damaging them. Moreover, the device is usable particularly advantageously with packages such as bags or blister packs which are already provided with respective slots, eyelets, or the like for the insertion of the guide means. In this case, the device can easily be incorporated in a system for the storage and withdrawal of the packages in which bags or the like, suspended on suitable supports by means of the slots, are slipped onto the guide means in order to form groups to be held together.

BRIEF DESCRIPTION OF THE DRAWINGS

Further characteristics and advantages will become clear from the following detailed description given with reference to the appended drawings, provided purely by way of non-limiting example, in which.

DETAILED DESCRIPTION

Figure 1:
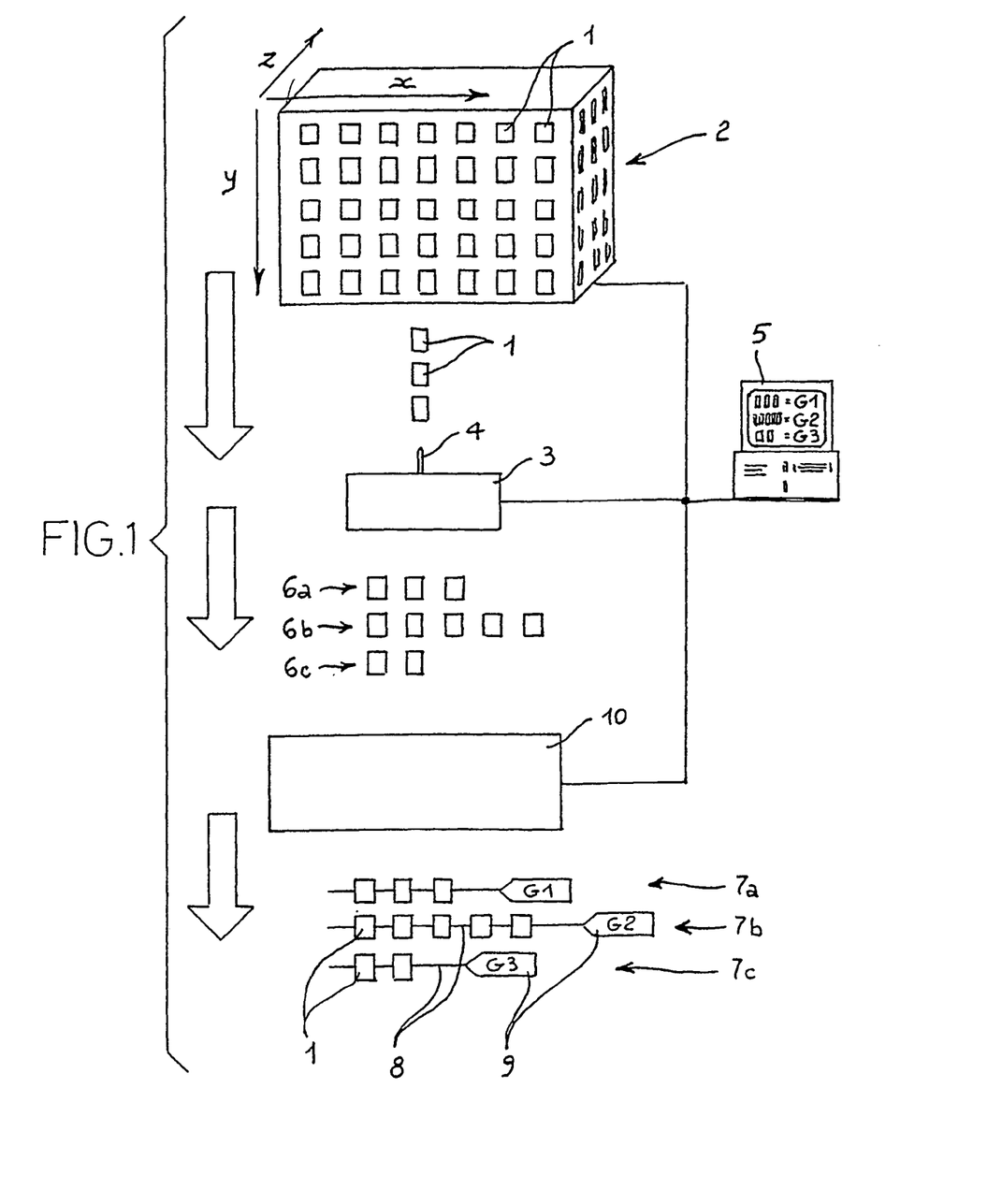
FIG. 1 is a schematic view of an automatic system for the withdrawal and delivery of articles provided with a device and operating in accordance with a method according to the present invention.

FIG. 1 shows schematically an automatic system for the withdrawal and delivery or distribution of articles 1, comprising a store 2 in which the articles 1 are stored in an orderly manner in accordance with a predetermined physical and logical structure, for example, in locations identified by three-dimensional coordinates x, y, z, so that they can be identified and collected by a collection and delivery device 3 provided with collecting means 4. An electronic processor 5 is programmed to know the location of the individual products 1 with reference to the coordinates x, y and z, and is connected or otherwise associated with the collecting device 3 in order to control it and address it selectively for the collection of products forming part of orders G1, G2, G3 entered and stored in the processor 5 in known manner. The collection and delivery device 3 outputs the products 1, grouped together logically in sets 6*a*, 6*b*, 6*c*, corresponding to the orders G1, G2, G3. Systems of this type, which are particularly suitable for the storage of packages of individual doses of pharmaceutical products, are known, for example, from the documents U.S. Pat. No. 5,468,110, U.S. Pat. No. 5,880,443 and U.S. Pat. No. 6,217,273 and will not therefore be discussed in further detail. It may, however, be useful to mention that the above-mentioned documents of the prior art describe storage systems in which the various products are stored in an orderly manner in locations disposed on one level and hence identified by two Cartesian coordinates x, y, or disposed on a cylinder, and hence identified by two polar coordinates α, z. Although the present invention is described and illustrated with reference to the three-dimensional store 2 of FIG. 1, it may also be applied, with functionally similar results, to the two-dimensional stores of the prior art, as well as to simpler one-dimensional systems, for example, belt conveyors and the like.

The logical sets of products 6*a*, 6*b*, 6*c* are supplied in succession to a grouping device 10 which, as will be described further below, outputs packs, groups, or bundles 7*a*, 7*b*, 7*c* of articles 1 physically connected to one another by restraining means 8, and corresponding to the sets of articles 6*a*, 6*b*, 6*c* input and to the orders G1, G2, G3 stored in the electronic processor 5. A corresponding identification label 9, prepared beforehand and supplied as an input to the grouping device 10, or generated on the spot, for example, by means of a printer (not shown) operatively connected to the electronic processor 5, may be associated with each group or bundle 7*a*, 7*b*, 7*c* of articles, and preferably restrained on the restraining means 8.

Figure 6:
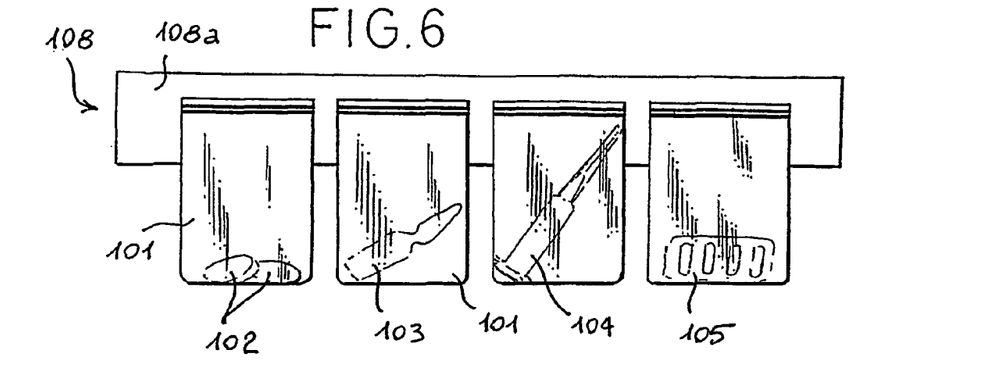
FIG. 6 is a front view of an example of the grouping-together of articles achieved by a system according to the present invention.
Figure 7:
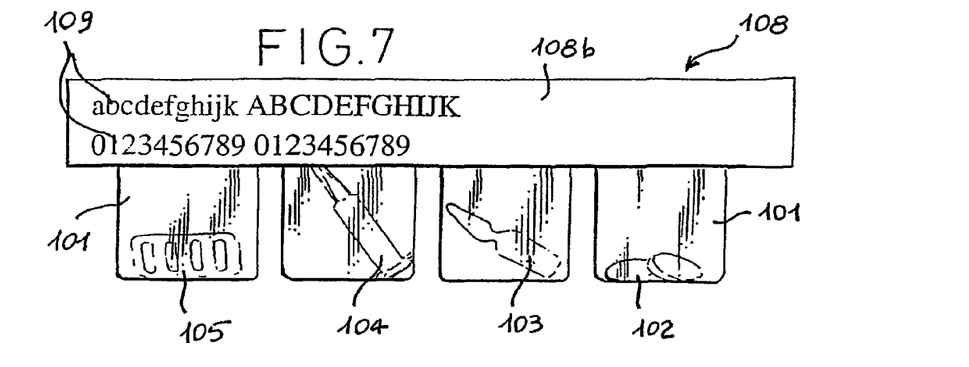
FIG. 7 is a rear view of the grouping of FIG. 6.

The restraining means 8 is preferably of elongate shape and comprises, for example, a thread or strip which is connected to each product of a single group by means of a glue, clips, or other similar means. FIGS. 6 and 7 show a particular embodiment in which the articles grouped together are constituted by bags 101 each of which contains medical or pharmaceutical products 102, 103, 104, 105. The bags 101 are fixed, at least by a portion thereof, to one face 108*a* of the strip 108 of fabric, paper, rubber, or other material, so as to form a group of articles grouped together. The bags 101 may be fixed to the strip 108 by means of a glue or mechanically by means of clips, staples, or the like.

Figure 8:
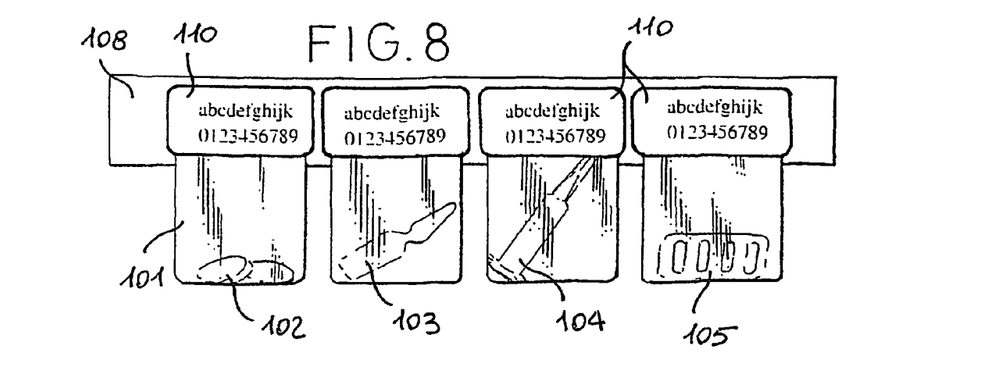
FIG. 8 is a front view of a variant of the grouping of articles of FIGS. 6 and 7, and FIGS. 9 and 10 are perspective views of two examples of the grouping-together of articles with restraining means closed into a loop.

The strip 108 may itself act as an informative label for the group of articles, by virtue of the fact that the data 109 characterizing the order or instructions for the various products contained in the bags 101, as well as possibly the destination of the order, for example, the department and/or the patient to whom the products are to be administered, may be printed on the other face 108*b* of the strip, opposite that to which the bags 101 are fixed. In the variant of FIG. 8, the bags 101 are fixed to the strip 108 by means of adhesive labels 110, each of which may give informative data specific to each product 102, 103, 104, 105 and/or general data relating to the order or instructions corresponding to the grouping of the articles.

Figure 9:
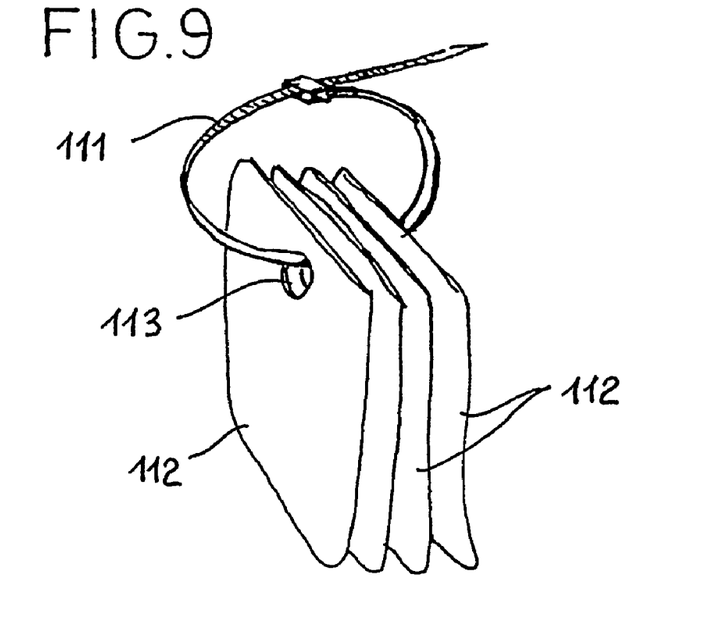

In a preferred embodiment, the thread or strip is inserted through holes provided in the articles, before being closed into a loop. In the embodiment of FIG. 9, a notched band 111 of generally known type is used to group together and restrain a set of bags 112, in each of which there is a hole or opening 113 which can usefully also be used for suspending the bags in the store 2 mentioned above with reference to FIG. 1.

Figure 10:
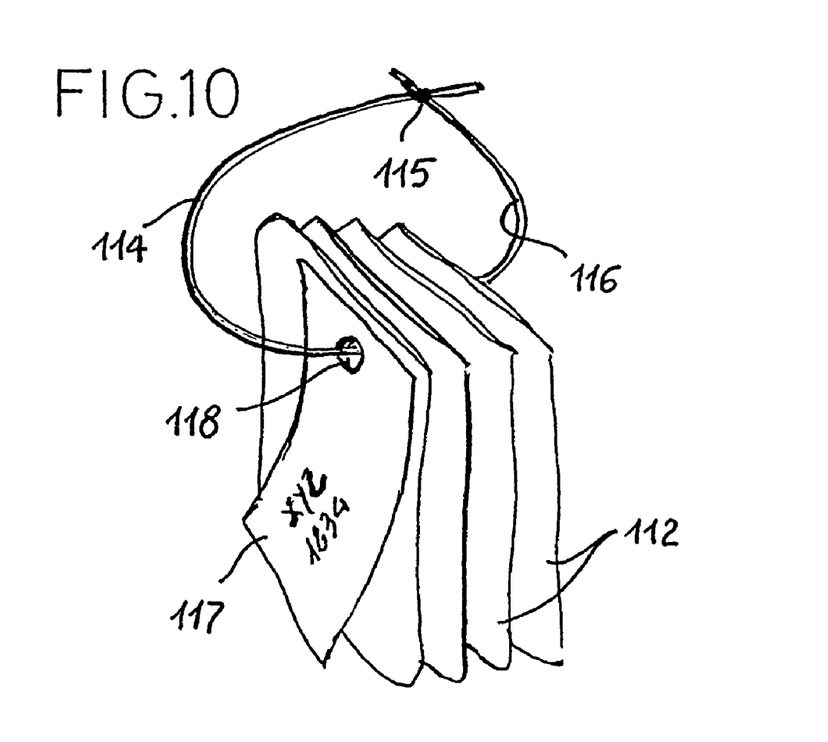

In particular, as shown in FIG. 10, the restraining means may be a thread or strip 114 of plastics material or other material suitable for being welded at the point 115 to form the closed loop 116 which groups the bags 112 together. An informative label 117, also provided with a hole or opening 118, may be associated with the group of bags 112.

Figure 2:
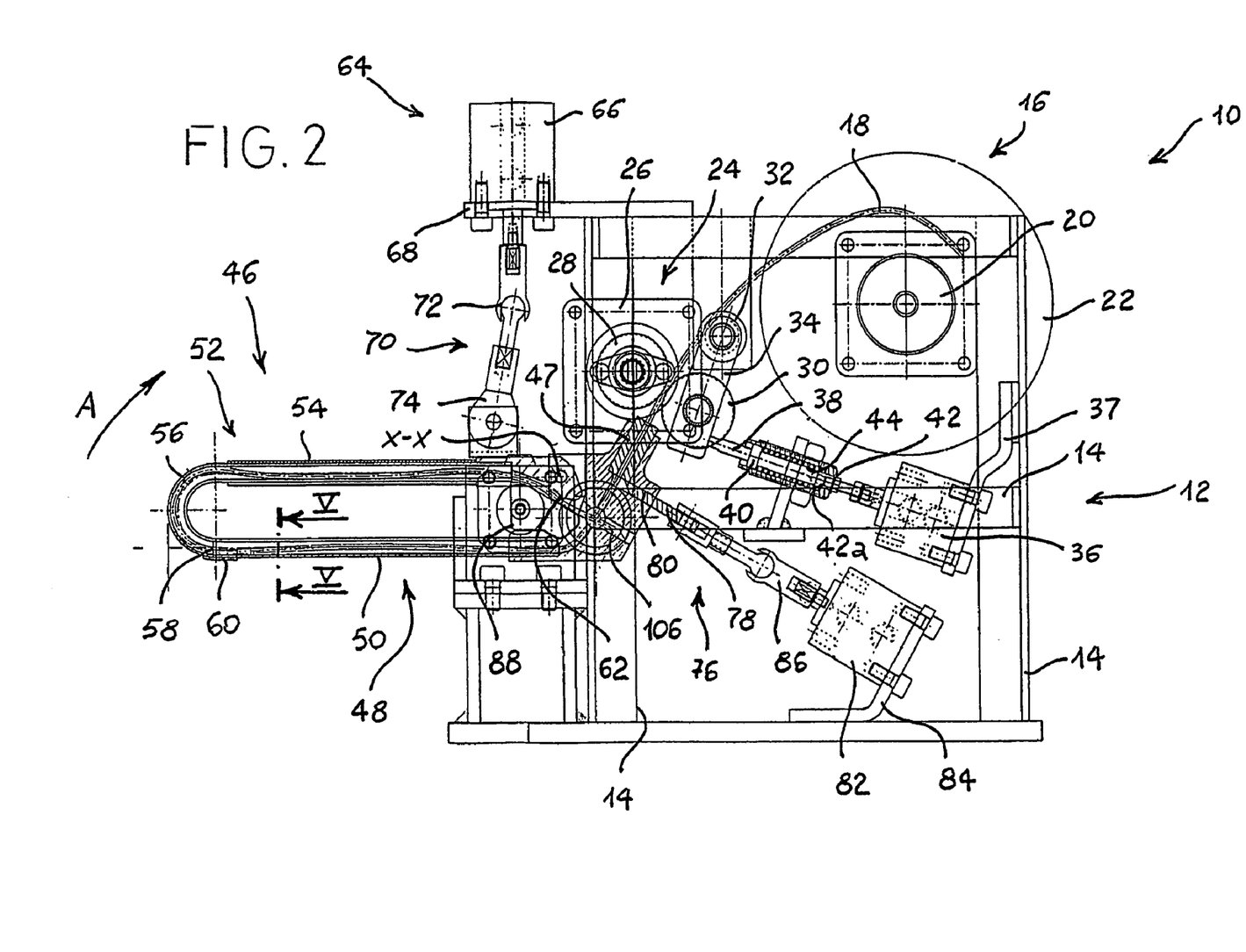
FIG. 2 is a side elevational view of an embodiment of a device for grouping articles together in accordance with the present invention, arranged for the direct feed of the restraining means.

With regard to this latter solution for the grouping-together of articles and with reference now to FIG. 2, a particular embodiment of the device 10 for grouping together and restraining the articles 1, in particular but not exclusively individual packages or bags of products, comprises a load-bearing structure 12, preferably formed by profiled sections 14 of various shapes, assembled to form a frame. A unit 16 for supporting and moving the means for restraining the products, in particular a thread 18, is disposed on the load-bearing structure 12. The unit 16 comprises a motor 20, preferably an electric motor, and means for holding the thread 18, in particular a reel 22. Naturally, for the purposes of the implementation of the device 10, the thread 18 may be replaced by functionally similar elements such as strings or bands of material that can be welded, for example, thermoplastic material.

A feed unit 24 is also mounted on the frame 12 in a position such as to receive the thread 18 output from the reel 22. The feed unit 24 comprises a motor 26, at least one drive roller 28 for the thread 18, and a thrust roller 30, disposed opposite the drive roller 28 and mounted, together with an idle roller 32, on a pivoting arm 34. A linear actuator 36 mounted on the frame 12 by means of a support bracket 37, is connected to the pivoting arm 34 by means of a rod 38 provided with a collar 40 which slides in a tubular body 42 so as to compress a spring 44.

A guide for the thread 18, generally indicated 46, is mounted on the frame 12 at the output of the feed unit 24 and comprises a fixed portion 48 and a movable portion 52 which can be closed selectively onto the fixed portion 48 to form, as a whole, a closed guide path. The guide 46 preferably has an open ring-shaped cross-section (see FIG. 5) in which a channel 46a has an opening 46b facing towards the inside of the guide path formed by the fixed and movable portions 48 and 52 of the guide 46.

A lead-in input bush 47 for the thread 18 is positioned at one end of the fixed guide portion 48. The fixed guide portion 48 also comprises a fixed guide member 50 which, preferably but in non-limiting manner, extends in a horizontal direction.

The movable guide portion 52 is articulated to the frame 12 so as to be pivotable about a horizontal axis X-X as indicated by the arrow A in FIG. 2. The movable guide portion 52, preferably but in non-limiting manner, comprises a guide portion 54 which, in the closed configuration of the guide 46 shown in FIG. 2, is substantially parallel to the fixed guide member 50 of the fixed guide portion 48 and is extended by a connecting portion 56. The fixed guide member 50 has an end 58 by which it is connected to the connecting portion 56 and in which a locating abutment 60 is formed for the movable guide portion 52. The movable guide portion 52 has, at the end remote from the connecting portion 56, a shaped portion 62 having the function of a jaw, the purpose of which will become clearer from the following description. An actuator unit 64 is mounted on the frame 12 in order to move the movable guide portion 52 selectively and comprises, in the non-limiting embodiment of FIG. 2, a linear actuator 66 fixed to the frame 12 by means of a bracket 68 and an articulated system 70 preferably comprising a ball joint 72 and a hinge 74 fixed to the movable guide portion 52.

The device 10 also comprises means 76 for cutting the thread 18, comprising a blade 78 fitted in the manner of a guillotine, in a compartment 80 formed at the outlet of the lead-in bush 47, transverse the feed axis of the thread 18, and a linear actuator 82 fixed, for example, to the base of the frame 12 by means of a bracket 84, and connected to the blade 78 by means of a ball joint 86.

Figure 4:
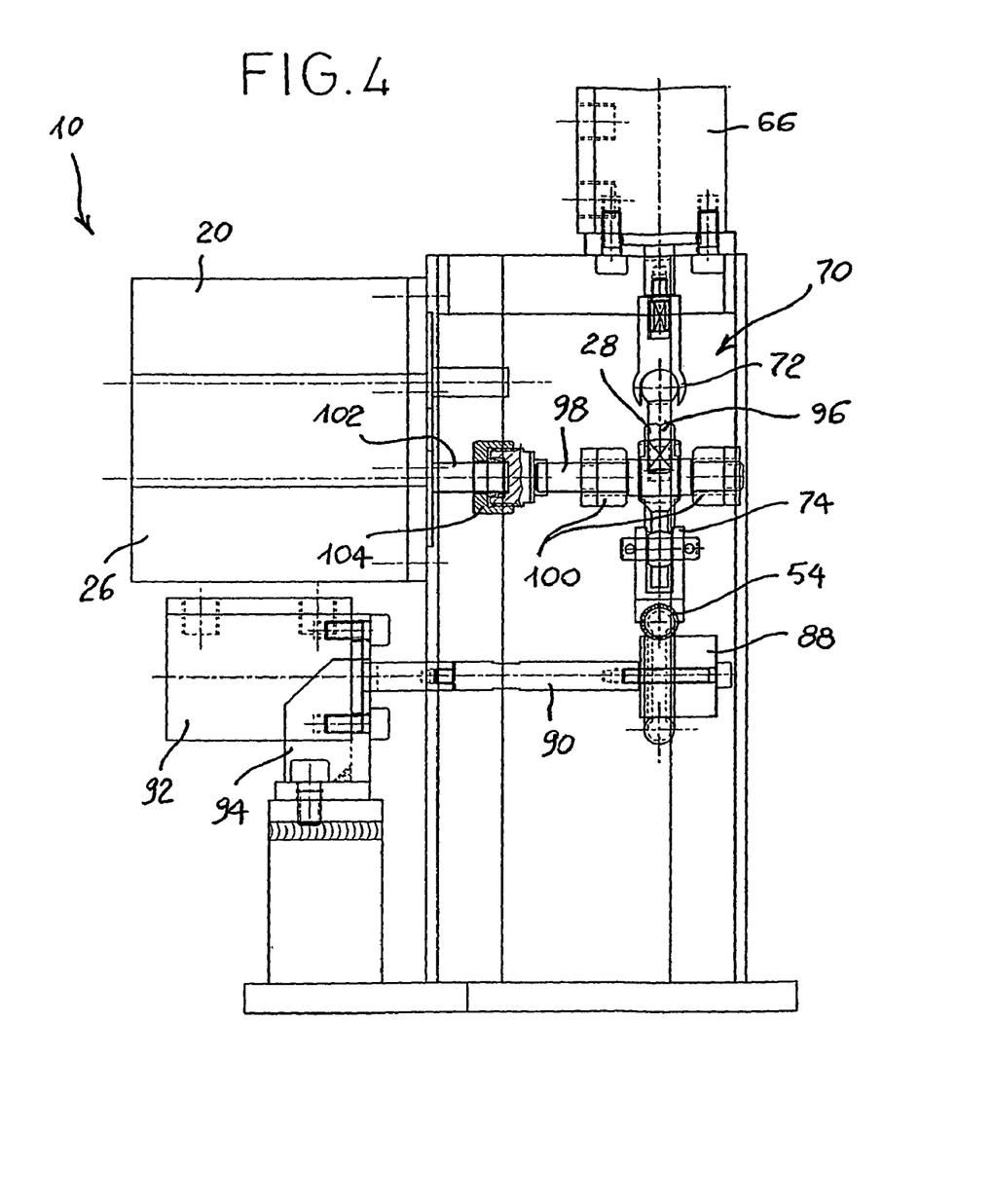
FIG. 4 is a front elevational view of the device of FIG. 2, shown partially in section and on an enlarged scale.

Inside the closed path formed by the guide 46, in the vicinity of the shaped portion 62, there is a retaining element for selectively restraining the thread 18, and preferably comprising a block 88 suitable for providing an abutment surface. With reference to FIG. 4, the block 88 is connected, by means of a rod 90, to an actuator 92 which in turn is fixed to the frame 12 by means of a bracket 94. The drive roller 28, preferably but in non-limiting manner, has a peripheral groove 96 for guiding the thread 18 and is mounted on a shaft 98 supported, for example, by two plain bearings 100 fixed to the frame 12 in a manner not shown. The shaft 98 is connected to the drive shaft 102 of the motor 26 by means of a reduction unit 104, for example, an epicyclic unit.

During the normal operation of the device 10, the thread 18 passes between the drive roller 28 and the thrust roller 30 whilst the idle roller 32 ensures that the thread coming from the reel 22 is not subject to excessive curvature. The thrust roller 30 has the function of keeping the thread 18 pressed against the drive roller 28 so that this roller can selectively transmit to it a forward movement towards the guide 46, in a direct-feed mode, or an opposite movement in a reverse-feed mode in which the thread 18 is returned from the guide 46. The actuator 36 ensures the necessary pressure which is calibrated by the preloading of the spring 44. The thread 18 at the output of the feed means 24 is received by the lead-in bush 47 which supplies an input of the guide 46. In the configuration described up to now, the device 10 is arranged for performing a cycle for the grouping-together and tying of articles, an example of which is given below but which should not be considered as limiting of the possibilities for the use of the device 10 or, more generally, of the present invention.

In an initial step, the movable guide portion 52 is raised away from the fixed guide portion 50, by means of the actuator 66. Individual packages of products, not shown, which are to be grouped together and restrained relative to one another, are positioned in a manner such that the at least one fixed guide member 50 extends through respective slots, eyelets, or the like, suitably provided therein. The movable guide portion 52 is then closed so that the guide means 46 form a substantially closed path through the individual packages.

Figures 3, 5:
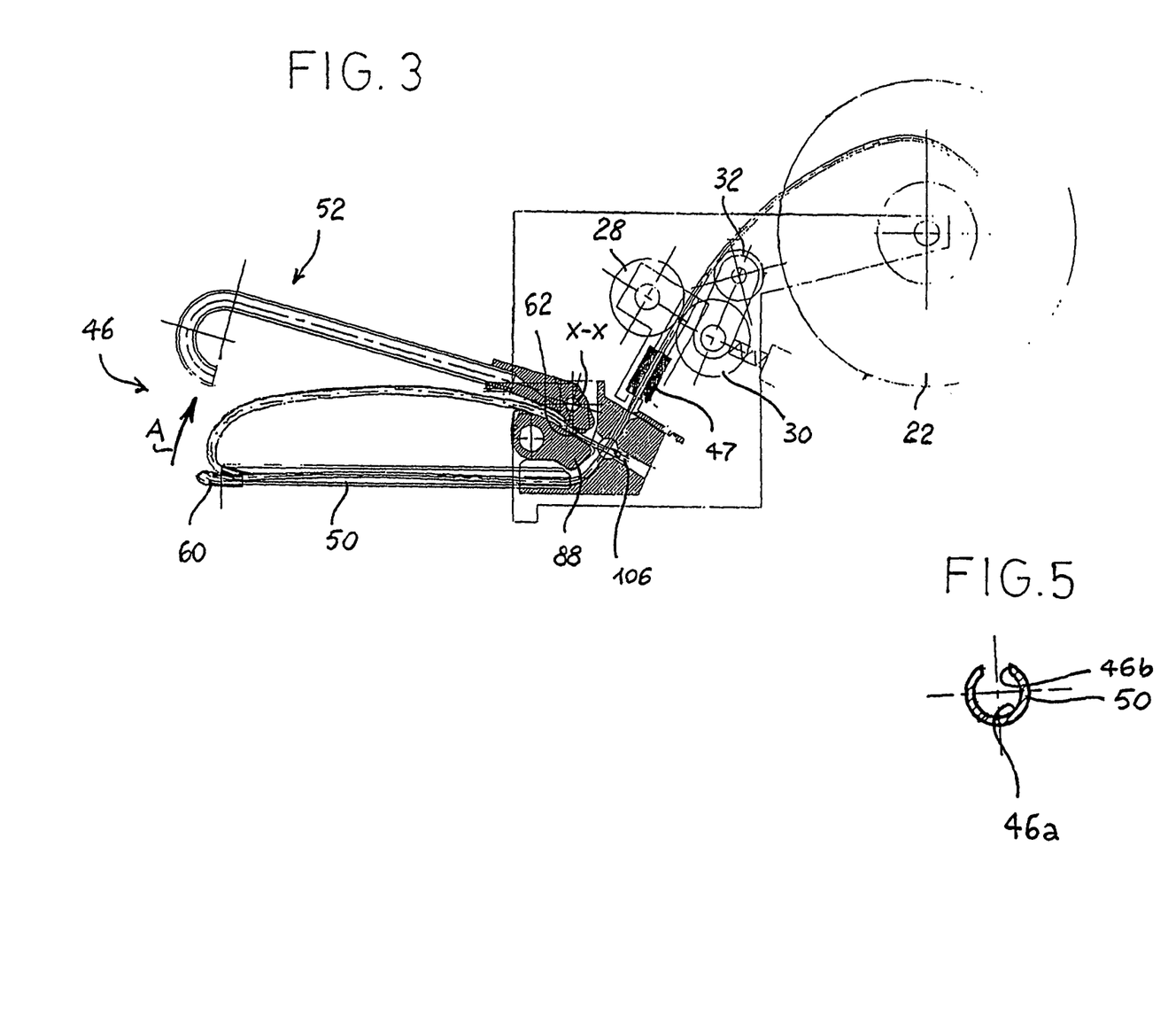
FIG. 3 is a schematic side elevational view of the device of FIG. 2, in which the outer shapes of the main members are shown and in which the guide means are in a position for locking the restraining means.
FIG. 5 is a section taken on the line V-V of FIG. 2 through the fixed guide member, on an enlarged scale.

In a subsequent step, the feed means 24 are operated in direct-feed mode by the drive means 26 so as to cause the thread 18 to pass through the guide 46 until an overlap is created between the free end 106 of the thread 18 and the portion of thread 18 input into the guide 46. The movable guide portion 54 is then raised again by the actuator 66 so that, by virtue of its pivoting about the axis X-X, the shaped portion 62 squeezes the free end 106 of the thread 18 against the block 88, holding it in a clamped position, as shown in FIG. 3. At this point, the feed means 24 are operated in reverse-feed mode, in order to recover the thread 18 until the size of the closed loop which it forms through the individual packages is reduced to a predetermined dimensions. During this step, the thread 18 is free to leave the guide 46, by virtue of the opening 46b provided in the channel 46a (see FIG. 5) so that the thread 18 can be recovered and the individual packages of products can be grouped together in a pack or bundle.

The body of the thread 18 and its free end 106, which are superimposed, are then joined or welded together, for example, by means of a heat-sealing rod which is moved selectively towards the region of intersection and superimposition of the thread 18 and its end 106. The blade 78, operated by the actuator 82, then separates the loop of thread 18 restraining the individual packages from the rest of the thread 18 wound on the reel 22. At the end of the cycle, the actuator 92 removes the block 88 from the guide 46, allowing the restrained packages to be released.

According to a particularly advantageous variant, the heat-sealing rod may also incorporate the separation function of the blade 78, or may act simultaneously therewith.

According to another particularly advantageous variant, the device 10 is associated with the collection and delivery device 3 of FIG. 1 which may comprise a pin or other member on which the products 1 of each logical set 6a, 6b, 6c making up a specific order G1, G2, G3 are suspended. The collecting member 4 of the collection and delivery device 3 and/or the guide 46 of the device 10 can be inclined selectively, so that the fixed guide portion 48 can receive the individual packages of products 1 by gravity. In the preferred situation, in which the guide 46 is selectively inclinable, an opposite inclination of the guide 46 to that used for the collection of the individual package from the collection and delivery device 3 enables the groups or bundles 7a, 7b, 7c of articles physically connected to one another to be released and discharged automatically.

As mentioned above, the cycle for the grouping-together of the articles 1 by means of the device 10 described above may also comprise the insertion, in the group or bundle of articles restrained by the thread 18, of a label, preferably but in non-limiting manner, generated by printing means connected to the electronic processor 5, and giving data useful for the identification of the articles grouped together and/or of their final destination of use within the system for the distribution of the articles 1.

Naturally, the principle of the invention remaining the same, the details of construction and forms of embodiment may vary widely with respect to those described and illustrated, without thereby departing from the scope of the present invention.

The invention claimed is:

1. An automated system for the delivery and distribution of articles in groups, comprising:
    a store of articles;
    means for the collection and delivery of articles from the store;
    control means associated with the collection and delivery means for controlling the selective collection of articles from the store and their output as sets of articles logically grouped together; and
    a grouping device receiving at its input the sets of articles logically grouped together and outputting corresponding packs, groups or bundles of articles physically connected to one another by restraining means,
    wherein the restraining means comprises an elongate member that is closed into a loop in order to group a respective one of said sets of articles together, the elongate member passing through holes or openings provided on the articles.

2. An automated system according to claim 1, wherein the control means comprises electronic processor means, and the articles are grouped together logically in the sets and physically connected in the corresponding packs, groups or bundles in accordance with corresponding orders or instructions entered and/or stored in the electronic processor means.

3. An automated system according to claim 1, further comprising means for generating labels identifying the orders or instructions, wherein the grouping device associates the labels with each corresponding group of articles.

4. The automated system according to claim 3, wherein the elongate member acts as the label.

5. The automated system according to claim 1, wherein the elongate member is a thread.

6. The automated system according to claim 1, wherein the elongate member is a strip.

7. The automated system according to claim 1, wherein the elongate member is a notched band.

8. The automated system according to claim 1, wherein the elongate member is made of materials that can be welded in order to form the loop.

9. The automated system according to claim 1, further comprising a unit for supporting and moving the elongate member for said passing of said elongate member through said holes.

10. The automated system according to claim 1, further comprising cutting means for cutting the elongate member, the cutting means comprising a blade and a linear actuator connected to the blade by a ball joint.

11. An automated system for delivering and distributing articles in bundles, comprising:
    a store for storing articles in a storage location, said articles having holes therein;
    collection and delivery means for collecting and delivering groups of said articles from the store for subsequent bundling;
    control means connected to the collection and delivery means for controlling the collection and delivery means to selectively collect said articles from the store such that said articles are grouped together as logical sets of said articles;
    restraining means comprising an elongate member that is provided in an open condition and can be closed into a loop in a closed condition in order to bundle each said logical set of said articles together, the elongate member being inserted through said holes provided on articles in said open condition; and
    a grouping device for receiving the logical sets of said articles when grouped together, inserting said elongate member in the open condition through said holes and closing said elongate member to said closed condition, and outputting, corresponding to the logical sets of articles, bundles of said articles physically connected to one another by the elongate member.

12. The automated system according to claim 11, wherein the grouping device comprises a load-bearing structure, means for supporting the articles, a feed unit for supplying the elongate members, guide means for forming a path for the elongate members being inserted through said holes on said articles, and joining means for joining end portions of the elongate members together in said loop in said closed condition in order to connect said articles together.

13. The automated system according to claim 12, wherein the feed unit is operable in a direct-feed mode in order to urge the elongate member through the guide means and in a reverse-feed mode in order to return the elongate member.

* * * * *